United States Patent
Walker et al.

(10) Patent No.: US 12,421,350 B2
(45) Date of Patent: Sep. 23, 2025

(54) PROCESS OF PREPARING A POLY(ANTHRANILIDE), POLY(ANTHRANILIDE) AND ITS USE

(71) Applicant: Covestro Deutschland AG, Leverkusen (DE)

(72) Inventors: Karolina Walker, Cologne (DE); Aurel Wolf, Wülfrath (DE); Stefan Westhues, Leverkusen (DE); Mike Schuetze, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 452 days.

(21) Appl. No.: 18/001,888

(22) PCT Filed: Jul. 5, 2021

(86) PCT No.: PCT/EP2021/068522
§ 371 (c)(1),
(2) Date: Dec. 15, 2022

(87) PCT Pub. No.: WO2022/008450
PCT Pub. Date: Jan. 13, 2022

(65) Prior Publication Data
US 2023/0235120 A1 Jul. 27, 2023

(30) Foreign Application Priority Data
Jul. 7, 2020 (DE) .......................... 102020004074.8
Jun. 29, 2021 (EP) ...................................... 21182239

(51) Int. Cl.
*C08G 69/12* (2006.01)
*C08G 69/04* (2006.01)
*C08G 69/08* (2006.01)

(52) U.S. Cl.
CPC ............. *C08G 69/12* (2013.01); *C08G 69/04* (2013.01)

(58) Field of Classification Search
None
See application file for complete search history.

(56) References Cited

U.S. PATENT DOCUMENTS

| 4,066,424 A | 1/1978 | Kilgren et al. |
| 4,233,459 A | 11/1980 | Kilpper et al. |
| 4,328,339 A | 5/1982 | Kilpper et al. |
| 9,683,126 B2 | 6/2017 | Kou et al. |
| 10,703,709 B2 | 7/2020 | Jager et al. |
| 2005/0154180 A1 | 7/2005 | Hessefort et al. |

FOREIGN PATENT DOCUMENTS

| JP | S47034993 A | 11/1972 |
| JP | H0892478 A | 4/1996 |

OTHER PUBLICATIONS

Hamuro et al., "Oligoanthranilimides. Non-peptide submits that show formation of specific secondary structure." Journal of American Chemical Society, vol. 118, pp. 7529-7541 (1996). (Year: 1996).*
Menger et al., "Decarboxylatoin of Isatoic Anhydride in the Crystalline State," Journal of Organic Chemistry, 52, p. 315-316, (1987) (Year: 1987).*
Amin, F. et al, "Polyanthranilides. I. Synthesis and Characterization of Polyamides from isatoic Anhydrides", J. Macromol. Sci.-Chem. 1982, A17(3), pp. 481-488.
Staiger, R. P. et al, "Isatoic Anhydride. II. Reactions of Isatoic Anhydride with Ammonia", Journal of Organic Chemistry 1948, 13, pp. 347-352.
Hoorfar, A. et al, "Synthesis and conformational behaviour of tetra-anthranilides", Tetrahedron Letters, Elsevier, Amsterdam, NL, vol. 21, Jan. 1, 1980, pp. 4211-4214.
Hamuro, Yoshitomo et al., "Oligoanthranilamides. Non-Peptide Subunits That Show Formation of Specific Secondary Structure" Journal of the American Chemical Society, American Chemical Society, vol. 118, Jan. 1, 1996, pp. 7529-7541.
Coppola, Gary M., "The Chemistry of Isatoic Anhydride", Synthesis, Georg Thieme Verlag, Stuttgart, DE, vol. 7, Jan. 1, 1980, pp. 505-536.
International Search Report, PCT/EP2021/068522, date of mailing: Oct. 26, 2021, Authorized officer: Christian Wohnhaas.

* cited by examiner

*Primary Examiner* — Ha S Nguyen

(74) *Attorney, Agent, or Firm* — Donald R. Palladino

(57) ABSTRACT

The present invention relates to a process of preparing a poly(anthranilamide) comprising the steps: (A) providing an anthranilate, and (B) reacting the anthranilate by polycondensation and separation of the alcohol on which the anthranilate is based in the presence of a catalyst to poly(anthranilamide), the poly(anthranilamides) obtained in this way and their use in the production of fibers of composite materials.

19 Claims, No Drawings

PROCESS OF PREPARING A POLY(ANTHRANILIDE), POLY(ANTHRANILIDE) AND ITS USE

CROSS-REFERENCE TO RELATED APPLICATIONS

This application is a national stage application under 35 U.S.C. § 371 of PCT/EP2021/068522, filed Jul. 5, 2021, which claims benefit of European Application No. 21182239.0, filed Jun. 29, 2021 and German Application No. 10 2020 004 074.8, filed Jul. 7, 2020, each of which is incorporated herein by reference.

FIELD

The present invention relates to a process for preparing a poly(anthranilamide), comprising the steps of (A) providing an anthranilic ester, (B) converting the anthranilic ester by polycondensation with elimination of the parent alcohol of the anthranilic ester in the presence of a catalyst to give poly(anthranilamide), to the poly(anthranilamides) obtainable in this way and to the use thereof in the production of fibers or of composite materials.

BACKGROUND

Aromatic polyamides (also called aramids) in which amide groups are bonded to aromatic groups are known from the prior art and are distributed under trade names such as Kevlar, Twaron (poly(para-phenyleneterephthalamide)) or Nomex, Teijinconex (poly(meta-phenyleneisophthalamide)). They find use in various fields. A prominent example is the production of fibers, especially textile fibers. Fibers produced from aramids are notable for very high strength, high impact resistance, high elongation at break and good vibration damping. They are additionally very heat- and fire-resistant. A disadvantage is high cost compared to many other polymers. Aramids are usually prepared by polycondensation from an aromatic dicarbonyl halide ClCO—Ar$^1$—COCl and and aromatic diamine H$_2$N—Ar$^2$—NH$_2$, which necessarily leads to a polymer structure having alternating units derived from the dicarboxylic acid and the diamine (-[—CO—Ar$^1$—CO—NH—Ar$^2$—NH]—; AABB polymer structure).

A. F. Amin, B. P. Suthar and S. R. Patel describe, in *J. Macromol. Sci.-Chem.* 1982, A17(3), 481-488, the preparation of poly(anthranilamides) having 3 to 10 repeat units. Given the comparatively low number of repeat units, the products formed should if anything be referred to as oligomers.

The reaction of isatoic anhydride with ammonia in various concentrations was described as early as 1947 by R. P. Staiger and E. C. Wagner (published in 1948 in Journal of Organic Chemistry 1948, 13, 347-352). At low ammonia concentrations, anthranilamide was obtained with elimination of carbon dioxide. At high ammonia concentrations, cyclic benzoylurea was obtained instead, with elimination of water. With reference to even earlier studies, the formation of "abnormal" products from ammonia and isatoic anhydride is likewise reported, specifically when isatoic anhydride is treated with just a half equivalent of ammonia. This affords an amorphous product which is described as a condensation product. The literature reference *J. Macromol. Sci.-Chem.* 1982, A17(3), 481-488 that has already been cited also refers to "abnormal products" with reference to earlier studies (abnormal in the sense that these products are insoluble in ethanol and melt over a wide temperature range). These abnormal products, according to *J. Macromol. Sci.-Chem.* 1982, A17(3), 481-488, however, have never been characterized systematically, and the multitude of reports suggests, according to this reference, that such "abnormal" products are simply mixtures of "normal" products.

U.S. Pat. No. 9,683,126 B2 describes polymers having a C—C backbone onto which up to 10 anthranilamide units are grafted via a divalent bridge. The base polymer that forms the C—C backbone especially comprises differently substituted poly(methacrylates) or polymeric vinylaromatic hydrocarbons.

There is no description in these literature references of the formation of higher molecular weight poly(anthranilamides) in which high molar masses are achieved via a multitude of repeat anthranilamide units and not by grafting onto another polymer (i.e. the formation of "true" anthranilamide polymers by contrast with oligomers having only few repeat units or copolymers). Other, more commonly used aramids such as the (poly(para-phenyleneterephthalamides)) and (poly(meta-phenyleneisophthalamides)) that were mentioned at the outset can be prepared in high molar masses (albeit under very corrosive conditions owing to the use of acid chlorides, which is costly and inconvenient in terms of apparatus and process operation) and also have very good performance properties, but are very costly. Moreover, the commonly used processes for preparing such aramids are based on a polycondensation reaction with formation of an AABB polymer structure, which requires very precise compliance with the reaction stoichiometry for formation of polymers having high molar masses.

A. Hoorfar, W. David 011 is and J. Fraser Stoddart describe, in Tetrahedron Letters 1980, 21, 4211-4214, the formation of cyclic anthranilamides from (linear) oligomeric anthranilamides having up to four anthranilamide units. The oligomeric anthranilamides are obtained in turn by a complex multistage synthesis.

Oligomers based on the anthranilamide unit are also described by Yoshimoto Hamuro, Steven J. Geib and Andrew D. Hamilton in *J. Am. Chem. Soc.* 1996, 118, 7529-7541. These products are obtained by a sequence of acylation, hydrogenation and acetylation using 2-nitrobenzoyl chloride, methyl anthranilate and acetyl chloride as reactants.

SUMMARY

There was therefore a need for further improvements in the field of aramid chemistry.

Taking account of this need, the present invention therefore provides a process for preparing a poly(anthranilamide), comprising the steps of:
(A) providing an anthranilic ester (RO(O=C)(ortho-C$_6$H$_4$)—NH$_2$),
(B) converting the anthranilic ester by (self-)polycondensation with elimination of an alcohol (namely the parent alcohol ROH of the anthranilic ester) in presence of a catalyst to give poly(anthranilamide).

The present invention further provides a poly(anthranilamide) of the formula $$RO-[(O=C)(ortho-C_6H_4)-NH]_n-H \qquad (I)$$

in which R is an aliphatic organic radical (derived from the parent alcohol ROH of the anthranilic ester) and n denotes the number of repeat units.

Finally, the invention provides for the use of a poly(anthranilamide) of the invention in the production of fibers or of composite materials from poly(anthranilamide) and (at least) one other material comprising a metal, a mineral material or a polymer other than poly(anthranilamide).

In the terminology of the invention, organic solvents are understood to mean nonionic organic solvents, as opposed to ionic liquids (=low-melting (i.e. below 100° C.) salts).

The method crucial for the determination of the number of repeat units n in the context of the present invention is $^1$H NMR spectroscopy. This gives an average for the number of repeat units, from which the number-average molar mass of the poly(anthranilamide) can be calculated. Details are described in the "Analysis" section further down.

There now follows a brief summary of various possible embodiments of the invention.

In a first embodiment of the process of the invention, which can be combined with all other embodiments, the catalyst used in step (B) comprises
(1)
an alkyl compound,
an alkyl halide compound,
an acetylacetonate,
a carboxylate,
an alkoxide, and/or
a chloride
of a metal of group 1, 4, 11, 12, 13 or 14 of the Periodic Table of the Elements or (2) a Brønsted acid.

In a second embodiment of the process of the invention, which is a particular configuration of the first embodiment, the metal of groups 1, 4, 11, 12, 13 or 14 of the Periodic Table of the Elements comprises Li, Ti, Cu, Zn, Al, Hf, Zr and/or Sn.

In a third embodiment of the process of the invention, which is a particular configuration of the first and second embodiments, the alkyl compound comprises diethylzinc and/or triethylaluminum.

In a fourth embodiment of the process of the invention, which is a particular configuration of the first to third embodiments, the alkyl halide compound comprises dichloro(ethyl)aluminum and/or chloro(diethyl)aluminum.

In a fifth embodiment of the process of the invention, which is a particular configuration of the first to fourth embodiments, the acetylacetonate comprises titanium (monoxide) acetylacetonate, zinc acetylacetonate and/or aluminum acetylacetonate.

In a sixth embodiment of the process of the invention, which is a particular configuration of the first to fifth embodiments, the carboxylate comprises zinc(II) acetate.

In a seventh embodiment of the process of the invention, which is a particular configuration of the first to sixth embodiments, the alkoxide comprises methoxide, ethoxide, isopropoxide, butoxide, isobutoxide and/or phenoxide.

In an eighth embodiment of the process of the invention, which is a particular configuration of the first to seventh embodiments, the alkoxide comprises aluminum triisopropoxide, titanium tetrabutoxide, titanium tetraisobutoxide and/or lithium methoxide.

In a ninth embodiment of the process of the invention, which is a particular configuration of the first to eighth embodiments, the chloride comprises zinc dichloride and/or iron trichloride.

In a tenth embodiment of the process of the invention, which is a particular configuration of the first to ninth embodiments, the Brønsted acid comprises a mineral acid selected from sulfuric acid, hydrochloric acid, nitric acid and/or phosphoric acid.

In an eleventh embodiment of the process of the invention, which can be combined with all other embodiments, the anthranilic ester comprises methyl anthranilate, ethyl anthranilate, propyl anthranilate, isopropyl anthranilate, butyl anthranilate and/or isobutyl anthranilate.

In a twelfth embodiment of the process of the invention, which can be combined with all other embodiments, step (B) is conducted at a reaction temperature in the range from 120° C. to 300° C. or in the range from 160° C. to 280° C. or in the range from 170° C. to 250° C.

In a thirteenth embodiment of the process of the invention, which can be combined with all other embodiments, step (B) is conducted at a pressure in the range from 0.10 $bar_{(abs.)}$ to <1.0 $bar_{(abs.)}$ or in the range from 1.0 $bar_{(abs.)}$ to 1.5 $bar_{(abs.)}$.

In a fourteenth embodiment of the process of the invention, which can be combined with all other embodiments, provided that they do not envisage the use of a solvent in step (B), step (B) is conducted in the absence of a solvent, wherein step (B) is followed by
(C)(i) dissolving the poly(anthranilamide) in a mineral acid to obtain a mineral acid solution of the poly(anthranilamide);
(D)(i) isolating the poly(anthranilamide) dissolved in the mineral acid from the mineral acid solution, comprising a step of precipitating in water.

In a fifteenth embodiment of the process of the invention, which is a particular configuration of the fourteenth embodiment, the mineral acid comprises sulfuric acid, hydrochloric acid, nitric acid and/or phosphoric acid and is especially sulfuric acid.

In a sixteenth embodiment of the process of the invention, which can be combined with all other embodiments except those that rule out the use of a solvent in step (B) or envisage a pure solvent polymerization for this step, step (B) is conducted in the presence of a solvent, the solvent comprises an organic solvent which is in liquid form under the reaction conditions of step (B) (especially at the reaction temperature), an ionic liquid or a mixture of aforementioned solvents, and, in step (B), the poly(anthranilamide) is obtained in such a way that it is suspended in the solvent, wherein step (B) is followed by:
(C)(ii) dissolving the poly(anthranilamide) suspended in the solvent in a mineral acid and separating off the solvent to obtain a mineral acid solution of the poly(anthranilamide);
(D)(ii) isolating the poly(anthranilamide) dissolved in the mineral acid from the mineral acid solution, comprising a step of precipitating in water.

In a seventeenth embodiment of the process of the invention, which is a particular configuration of the sixteenth embodiment, the mineral acid comprises sulfuric acid, hydrochloric acid, nitric acid and/or phosphoric acid and is especially sulfuric acid.

In an eighteenth embodiment of the process of the invention, which is a particular configuration of the sixteenth and seventeenth embodiments, the solvent is removed in step (C)(i) by filtration, centrifugation or phase separation.

In a nineteenth embodiment of the process of the invention, which can be combined with all other embodiments except those that rule out the use of a solvent in step (B) or envisage a suspension polymerization for this step, step (B) is conducted in the presence of a solvent, wherein the solvent comprises an ionic liquid or a mixture of an ionic liquid and an organic solvent which is in liquid form at the reaction temperature, and, in step (B), the poly(anthranilamide) is obtained in such a way that it is dissolved in the solvent, wherein step (B) is followed by:

(D)(iii) isolating the poly(anthranilamide) dissolved in the solvent from the solution in the solvent, comprising a step of precipitating in water.

In a twentieth embodiment of the process of the invention, which is a particular configuration of the sixteenth to nineteenth embodiments, the organic solvent comprises diphenyl ether, (especially $CaCl_2$)-containing)N-methyl-2-pyrrolidone, 1,3-dimethyl-2-imidazolidinone (DMI) and/or hexamethylphosphoramide.

In a twenty-first embodiment of the process of the invention, which is a particular configuration of the sixteenth to twentieth embodiments, the ionic liquid comprises 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate and/or dialkylimidazolium phosphates (such as, in particular, butyl-3-methylimidazolium phosphate, dimethylimidazolium diethylphosphate ("MMIM-DEP") and ethylmethylimidazolium diethylphosphate ("EMIM-DEP")).

In a twenty-second embodiment of the process of the invention, which can be combined with all embodiments, the providing of the anthranilic ester in step (A) proceeds from anthranilic acid.

In a twenty-third embodiment of the process of the invention, which is a particular configuration of the twenty-second embodiment, step (A) comprises a conversion of anthranilic acid to anthraniloyl chloride, wherein the anthraniloyl chloride is reacted with an alcohol (mainly the parent alcohol of the anthranilic ester) to give the anthranilic ester.

In a twenty-fourth embodiment of the process of the invention, which is a second particular configuration of the twenty-second embodiment, step (A) comprises a conversion of anthranilic acid to isatoic anhydride, wherein the isatoic anhydride is reacted with an alcohol (mainly the parent alcohol of the anthranilic ester) to give the anthranilic ester.

In a twenty-fifth embodiment of the process of the invention, which is a third particular configuration of the twenty-second embodiment, step (A) comprises a reaction of anthranilic acid with an alcohol (namely the parent alcohol of the anthranilic ester) to give the anthranilic ester, wherein the reaction is conducted especially at a pressure in the range from 1 $mbar_{(abs.)}$ to 100 $mbar_{(abs.)}$ and at a temperature in the range from 50° C. to 100° C. (in order to minimize yield losses through reaction of the anthranilic acid to give aniline).

In a twenty-sixth embodiment of the process of the invention, which is a particular configuration of the twenty-fourth and twenty-fifth embodiments, the reaction (of the isatoic anhydride or anthranilic acid) with the alcohol in step (A) is conducted in the presence of a catalyst.

In a twenty-seventh embodiment of the process of the invention, which is a particular configuration of the twenty-sixth embodiment, the catalyst used in step (A) comprises (1)
an alkyl compound,
an alkyl halide compound,
an acetylacetonate,
a carboxylate,
an alkoxide, and/or
a chloride
of a metal of group 1, 4, 11, 12, 13 or 14 of the Periodic Table of the Elements, or (2) a Brønsted acid, where preferred configurations of the catalyst are those as specified above for the second to tenth embodiments.

In a twenty-eighth embodiment of the process of the invention, which is a particular configuration of the twenty-sixth and twenty-seventh embodiments, step (B) is conducted without prior removal of the catalyst used in step (A), and no catalyst other than the catalyst used in step (A) is added (i.e. steps (A) and (B) are conducted with the same catalyst).

In a twenty-ninth embodiment of the process of the invention, which is a particular configuration of the twenty-second to twenty-eighth embodiments, the anthranilic acid is obtained by fermenting a raw material comprising
a fermentable carbon compound and
a nitrogen compound.

In a thirtieth embodiment of the process of the invention, which is a particular configuration of the twenty-ninth embodiment, the fermentable carbon-containing compound comprises starch hydrolyzate, sugarcane juice, sugarbeet juice and/or hydrolyzates of lignocellulose-containing raw materials, wherein the nitrogen-containing compound comprises gaseous ammonia, aqueous ammonia, ammonium salts and/or urea.

In a thirty-first embodiment of the process of the invention, which can be combined with all other embodiments, the progress of the polycondensation is controlled by removing the alcohol which is eliminated in the reaction in step (B).

In a thirty-second embodiment of the process of the invention, which can be combined with all other embodiments, the process of the invention affords a poly(anthranilamide) of the formula (I) in which n is in the range from 20 to 2500, preferably in the range from 40 to 2500, more preferably in the range from 50 to 2400, even more preferably in the range from 70 to 2000 and very exceptionally preferably in the range from 70 to 200, especially 70 to 100.

In a first embodiment of the poly(anthranilamide) of the invention, which can be combined with all other embodiments, R is methyl, ethyl, propyl, isopropyl, butyl or isobutyl.

In a second embodiment of the process of the invention, which can be combined with all other embodiments, n is in the range from 20 to 2500, preferably in the range from 40 to 2500, more preferably in the range from 50 to 2400, even more preferably in the range from 70 to 2000 and very exceptionally preferably in the range from 70 to 200, especially 70 to 100.

In a first embodiment of the use of the invention, which can be combined with all other embodiments, the fibers or composite materials serve for production of protective equipment (especially, but not limited to, items of apparel, for example of protective suits and vests) for defense from fire, splinter formation, the penetration of splinters, mechanical impacts (including shots) or cuts.

In a second embodiment of the use of the invention, which can be combined with all other embodiments, the fibers or composite materials serve for production of sports equipment.

DETAILED DESCRIPTION

The embodiments briefly outlined above and further possible embodiments of the invention are elucidated in detail hereinafter. All embodiments may be combined with one another as desired unless stated otherwise or unambiguously apparent from the context.

In step (A) of the process of the invention, an anthranilic ester (which comprises a mixture of different anthranilic esters) is provided for the purpose of the subsequent polycondensation. Anthranilic esters may in principle be prepared by any of the processes known in the specialist field for synthesis of such compounds. Typically, the synthesis proceeds from anthranilic acid (=ortho-aminobenzoic acid). Preferred anthranilic esters are methyl anthranilate, ethyl anthranilate, propyl anthranilate, isopropyl anthranilate, butyl anthranilate and/or isobutyl anthranilate.

Anthranilic acid can be prepared by known chemical processes. One example of a suitable chemical method is the reaction of phthalimide with sodium hypochlorite. Phthalimide can itself be obtained from phthalic anhydride and ammonia. The whole process is well known. An industrial process is likewise described in the patent literature; see, for example, DE 29 02 978 A1 and EP 0 004 635 A2. In addition, a fermentative preparation route for anthranilic acid has recently been published, which proceeds from renewable raw materials and is therefore capable of safeguarding fossil raw materials and reducing the size of the $CO_2$ footprint; see, for example, WO 2018/002088 A1, page 13 line 26 to page 22 line 15, and the literature cited therein. This fermentative process may also be employed in the process of the invention. In this embodiment, step (A) of the process of the invention therefore comprises the fermenting of a raw material comprising
  a fermentable carbon-containing compound, preferably starch hydrolyzate, sugarcane juice, sugarbeet juice, hydrolyzates of lignocellulose-containing raw materials or mixtures thereof, and
  a nitrogen-containing compound, preferably gaseous ammonia, aqueous ammonia, ammonium salts, urea or mixtures thereof.

Preferably, the fermentable carbon-containing compound comprises starch hydrolyzate, sugarcane juice, sugarbeet juice and/or hydrolyzates of lignocellulose-containing raw materials comprises, and in which the nitrogen-containing compound gaseous ammonia, aqueous ammonia, ammonium salts and/or urea.

Microorganisms suitable for performance of the fermentation are especially *Escherichia coli*, Pseudomonas putida, Corynebacterium glutamicum, Ashbya gossypii, Pichia pastoris, Hansenula polymorpha, Yarrowia lipolytica, Zygosaccharomyces bailii or *Saccharomyces cerevisiae*.

In one possible embodiment, anthranilic acid is first converted to anthraniloyl chloride, and the latter is reacted with an alcohol to give the desired anthranilic ester. Suitable methods for the conversion to the acid chloride include customary methods known in the specialist field, for example a reaction with thionyl chloride.

An alternative to conversion to an acid chloride may be conversion of the anthranilic acid to isatoic anhydride, which is then reacted with an alcohol to give the anthranilic ester. For this purpose, anthranilic acid can be reacted with phosgene, especially in a hydrochloric acid medium. Rather than phosgene, it is also possible to use diphosgene, triphosgene or further phosgenation media known from the prior art, such as oxalyl chloride, 1,1-carbonyldiimidazole and dimethyl carbonate. Likewise possible is the reaction of anthranilic acid with carbon monoxide in the presence of a catalyst, especially in the presence of a Pd or Pt catalyst, in order to obtain isatoic anhydride.

It is likewise possible to react anthranilic acid directly with an alcohol to give the desired anthranilic ester. In order to avoid yield losses as a result of reaction of the anthranilic acid to give aniline, it is appropriate to conduct this esterification at low temperatures (50° C. to 100° C.) and pressures (1 $mbar_{(abs.)}$ to 100 $mbar_{(abs.)}$).

In any case, the reaction with the alcohol can be facilitated by use of a catalyst, especially in the cases of reaction of isatoic anhydride with an alcohol and of direct esterification of anthranilic acid. Suitable catalysts are especially:

(1)
  an alkyl compound,
  an alkyl halide compound,
  an acetylacetonate,
  a carboxylate,
  an alkoxide, and/or
  a chloride
  of a metal of group 1, 4, 11, 12, 13 or 14 of the Periodic Table of the Elements, or
(2) a Brønsted acid.

The following preferences are applicable with regard to the catalysts:
  Suitable metals of groups 1, 4, 11, 12, 13 or 14 of the Periodic Table of the Elements are especially Li, Ti, Cu, Zn, Al, Hf, Zr and/or Sn.
  Suitable alkyl compounds are especially diethylzinc and/or triethylaluminum.
  Useful alkyl halide compounds are preferably dichloro(ethyl)aluminum and/or chloro(diethyl)aluminum.
  Examples of suitable acetylacetonates include titanium (monoxide) acetylacetonate, zinc acetylacetonate and/or aluminum acetylacetonate.
  A suitable carboxylate is especially zinc(II) acetate.
  Useful alkoxides are preferably methoxide, ethoxide, isopropoxide, butoxide, isobutoxide and/or phenoxide. More preferably, the alkoxide comprises aluminum triisopropoxide, titanium tetrabutoxide, titanium tetraisobutoxide and/or lithium methoxide.
  Suitable chlorides especially include zinc chloride and/or iron trichloride.
  Finally, the Brønsted acid used is preferably a mineral acid selected from sulfuric acid, hydrochloric acid, nitric acid and/or phosphoric acid.

In step (B) of the process of the invention, the anthranilic ester provided in step (A) is polycondensed. Since the anthranilic ester is reacting here" with itself", this is also referred to as "self-polycondensation". This eliminates the parent alcohol of the anthranilic ester (apart from an end group).

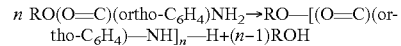

$n$ RO(O=C)(ortho-$C_6H_4$)$NH_2$→RO—[(O=C)(ortho-$C_6H_4$)—NH]$_n$—H+($n$−1)ROH The catalysts suitable for this purpose are the same as described above for step (A). The preferred configurations of these catalysts are also the same as described above for step (A). This opens up the option of conducting step (B) without prior removal of the catalyst used in step (A), in which case no catalyst other than the catalyst used in step (A) is added, i.e. steps (A) and (B) are conducted with the same catalyst. The polycondensation is then started merely by adjusting the reaction conditions appropriately (see the paragraphs that follow in this regard).

The polycondensation may in principle be conducted within wide temperature ranges, with the maximum temperature limited merely by the breakdown temperature of the feedstocks. Step (B) is conducted preferably at a reaction temperature in the range from 120° C. to 300° C., preferably in the range from 160° C. to 280° C., particularly in the range from 170° C. to 250° C.

There are likewise no particular requirements with regard to pressure. For instance, step (B) can be conducted at ambient pressure or slightly elevated pressure, especially in the range from 1.0 bar$_{(abs.)}$ to 1.5 bar$_{(abs.)}$. However, it is also possible to conduct step (B) at reduced pressure (especially in the range from 0.10 bar$_{(abs.)}$ to <1.0 bar$_{(abs.)}$). As a result, alcohol eliminated can evaporate more easily and hence the reaction can be conducted in the desired direction.

The polycondensation can be conducted (i) without solvent ("neat", "bulk polymerization") or in the presence of a solvent. In the latter case, a suitable solvent is (ii) an organic solvent which is liquid at the reaction temperature, (iii) an ionic liquid or (iv) a mixture of the two. Suitable solvents for case (ii) are especially diphenyl ether, N-methyl-2-pyrrolidone (preferably in conjunction with CaCl$_2$ as solubilizer), 1,3-dimethyl-2-imidazolidinone (DMI) and/or hexamethylphosphoramide. These are in liquid form at the suitable reaction temperatures (see above). For case (iii), in principle, the use of ionic liquids known in the specialist field is conceivable, especially 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate and/or dialkylimidazolium phosphates (such as, in particular, butyl-3-methylimidazolium phosphate, dimethylimidazolium diethylphosphate ("MMIM-DEP") and ethylmethylimidazolium diethylphosphate ("EMIM-DEP")).

In the case of performance of the ROP without solvent (i), the anthranilic ester is converted in the molten state. In the case of performance without solvent, polycondensation commences in homogeneous phase (in the melt). However, as polymerization progresses, there is rapid precipitation of polymer formed, such that a suspension of polymer in as yet unconverted monomer is obtained. As polymerization progresses further, there is generally substantial solidification of the entire reaction mixture.

The workup in this case preferably comprises the following steps:
  (C)(i) dissolving the poly(anthranilamide) in a mineral acid to obtain a mineral acid solution of the poly(anthranilamide);
  (D)(i) isolating the poly(anthranilamide) dissolved in the mineral acid from the mineral acid solution, comprising a step of precipitating in water.

A suitable mineral acid for the performance of step (C)(i) is especially sulfuric acid, hydrochloric acid, nitric acid and phosphoric acid. Sulfuric acid is preferred, especially sulfuric acid having a concentration by mass in the range from 96% to 100%, preferably 96% to 98%. The dissolving is preferably effected at a temperature in the range from 20° C. to 100° C.

If an organic solvent (ii) is used, a suspension of the poly(anthranilamide) is generally obtained (suspension polymerization). In this case, the workup of the process product in step (B) preferably comprises the steps of:
  (C)(ii) dissolving the poly(anthranilamide) suspended in the solvent in a mineral acid and separating off the solvent to obtain a mineral acid solution of the poly(anthranilamide);
  (D)(ii) isolating the poly(anthranilamide) dissolved in the mineral acid from the mineral acid solution, comprising a step of precipitating in water.

The preferred conditions mentioned above for case (i) of the steps of dissolving and isolating are also applicable to case (ii). The removal of the organic solvent additionally required here is preferably effected by filtration, centrifugation or phase separation. The removal may either precede the dissolving of the poly(anthranilamide) in mineral acid (in which case solid polyanthranilamide that generally still also contains trapped organic solvent is filtered off and then dissolved in the mineral acid) or follow thereafter (in which case organic solvent that has precipitated or is insoluble in the mineral acid is separated off).

If the solvent used in step B is an ionic liquid (iii), this step generally affords a solution of the poly(anthranilamide) (solution polymerization). Since the polymeric product in this case is already in solution, there is no need for a dissolving step (step (C)) in cases (i) and (ii)). In this case, the workup of the process product in step (B) therefore preferably comprises the step of:
  (D)(iii) isolating the poly(anthranilamide) dissolved in the solvent from the solution in the solvent, comprising a step of precipitating in water.

The preferred conditions mentioned above for case (i) for the step of isolating are also applicable to case (iii).

If a mixture of an organic solvent and an ionic liquid is used (iv) in step (B), whether the processed product is a solution or suspension depends on the mixing ratio. Depending on what is present, the further workup is as described above for case (iii) (solution) or for case (ii) (suspension).

Recovered solvent is preferably recycled in any case. For this purpose, a purification may be required, which can be effected by the methods known in the specialist field. On account of their high cost, the recycling of ionic liquids in particular is important. For this purpose, the ionic liquids obtained in the isolation of the poly(anthranilamide) in step (D)(iii) or step (D)(iv) are dried at elevated temperature and reduced pressure, especially at a temperature in the range from 50° C. to 100° C. and a pressure in the range from 1 mbar$_{(abs.)}$ to 100 mbar$_{(abs.)}$.

When the process product from step (B) is in the form of a solution, it is also conceivable to process this solution directly further to give the desired end product, especially to spin fibers of the poly(anthranilamide) directly from the solution.

The process of the invention enables the formation of high molecular weight poly(anthranilamides). The number of repeat units and hence the molar mass can be controlled via removal of the alcohol which is eliminated in the reaction. By determining the amount of alcohol removed, it is possible to use the (known) amount of anthranilic ester used to determine the degree of polymerization (Carothers equation). As soon as a desired degree of polymerization has been attained, the reaction can be stopped.

By the process of the invention, poly(anthranilamides) of the formula

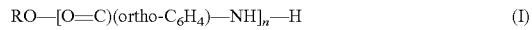
$$RO—[O=C)(ortho-C_6H_4)—NH]_n—H \qquad (I)$$

are obtainable, in which R is an aliphatic organic radical and n denotes the number of repeat units. Preferably, R represents methyl, ethyl, propyl, isopropyl, butyl or isobutyl. The number of repeat units n is, for example, in the range from 20 to 2500, preferably in the range from 40 to 2500, more preferably in the range from 50 to 2400, even more preferably in the range from 70 to 2000 and very exceptionally preferably in the range from 70 to 200, especially 70 to 100. The target number of repeat units is of course dependent on the desired end use for the poly(anthranilamide); therefore, it is optionally also possible to use values that vary from the figures given above.

The poly(anthranilamides) obtainable in accordance with the invention are suitable for various applications. Therefore, the present invention further provides for the use of a poly(anthranilamide) of the invention in the production of fibers or of composite materials from poly(anthranilamide) and (at least) one other material comprising a metal, a mineral material (e.g. concrete) or a polymer other than poly(anthranilamide) (e.g. polyurethane). The fibers or composite materials preferably serve for production of protective equipment (especially, but not limited to, items of apparel, for example of protective suits and vests) for defense from fire, from splinter formation, from penetration of splinters, from mechanical impacts (including shots) or from cuts. It is likewise possible to use the fibers or composite materials for production of sports equipment.

The invention is more particularly elucidated hereinafter with reference to examples.

EXAMPLES

Analysis

The number-average molar mass ($M_n$) of the resulting poly(anthranilamide) was determined by means of $^1$H NMR spectroscopy (from Bruker, AV III HD 600, 600 MHz; pulse sequence zg30, delay time d1: 10 s, 64 scans). Each sample was dissolved in deuterated sulfuric acid. The relevant resonances in the $^1$H NMR spectrum (based on TMS=0 ppm) are as follows:

The signals at 8.5-7.1 ppm are used for the aromatic protons of anthranilamide (corresponding to an integral of 4 protons). The resonances of the protons of the methyl ester end group have a shift of 3.56 ppm (methyl group, corresponding to an integral of 3 protons).

The molar mass $M_n$ of the polymer is calculated according to formula (I) as follows, using the following abbreviations:

F(A)=area of the resonance at 8.5-7.1 ppm of the aromatic protons (4 protons)
F(M)=area of the resonance at 3.56 ppm of the methyl group of methyl anthranilate (3 protons)

The following formula (I) was used to calculate the number of repeat units from oAB (n) in the polymer:

$$n = \frac{F(A)}{F(M)} \cdot \frac{3}{4} \quad (I)$$

The number n was used to calculate the molar mass $M_n$ of the polymer by the following formula (II):

$$M_n = 150.16^{g}/_{mol} + n \cdot 120.14^{g}/_{mol} + 1^{g}/_{mol} \quad (II)$$

Example 1 (Inventive): Preparation of Poly(Anthranilamide) by Polycondensation of Methyl Anthranilate in the Presence of Ti(OiPr)$_4$ as Catalyst A 500 mL four-neck flask was equipped with a distillation system, precision glass stirrer, temperature probe, nitrogen feed and gas inlet/gas outlet with pressure relief valve. Subsequently, 50 g of methyl anthranilate and 9.4 g of Ti(OiPr)$_4$ were weighed in. Nitrogen was introduced at 10 L/h for 20 minutes, in the course of which the solution was stirred at 300 rpm. Thereafter, the solution was stirred at 180° C. for 9 h.

The molar mass $M_n$ was determined by means of NMR in D$_2$SO$_4$.

Example 2 (Inventive): Preparation of Poly(Anthranilamide) by Polycondensation of Methyl Anthranilate in the Presence of Ti(OiPr)$_4$ as Catalyst and Diphenyl Ether as Solvent The reaction was conducted analogously to example 1, but in the presence of 50 mL of diphenyl ether.

Example 3: Preparation of Poly(Anthranilamide) by Polycondensation of Methyl Anthranilate Under Reduced Pressure in the Presence of Ti(OiPr)$_4$ as Catalyst and Diphenyl Ether as Solvent The reaction was conducted analogously to example 2, but at a pressure of 0.80 bar$_{(abs.)}$.

Example 4 (Comparative): Preparation of Poly(Anthranilamide) by Polycondensation of Methyl Anthranilate in the Absence of Ti(OiPr)$_4$ as Catalyst The reaction was conducted analogously to example 1, but in the absence of the catalyst. There was no conversion of the monomer here to resulting poly(anthranilamide).

The following table compares the results to one another:

| Example | Catalyst | Solvent | Pressure (abs) | Result | Mn [g/mol] |
|---|---|---|---|---|---|
| 1 | Ti(OiPr)$_4$ | — | 1.0 bar | Polymerization | 2554 |
| 2 | Ti(OiPr)$_4$ | Diphenyl ether | 1.0 bar | Polymerization | n.d. |
| 3 | Ti(OiPr)$_4$ | Diphenyl ether | 0.8 bar | Polymerization | n.d. |
| 4 | — | — | 1.0 bar | No conversion of the monomer | n.d. |

(n.d. = not determined)

The invention claimed is:

1. A poly(anthranilamide) of the formula

RO—[(O=C)(ortho-C$_6$H$_4$)—NH$_n$—H

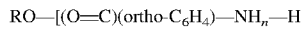

in which R is an aliphatic organic radical and n denotes the number of repeat units and is in the range from 20 to 2500.

2. The poly(anthranilamide) as claimed in claim 1, in which R is methyl, ethyl, propyl, isopropyl, butyl or isobutyl.

3. The poly(anthranilamide) as claimed in claim 1, in which n is in the range from 70 to 2000.

4. The poly(anthranilamide) as claimed in claim 3, in which n is in the range from 70 to 200.

5. The poly(anthranilamide) as claimed in claim 4, in which n is in the range from 70 to 100.

6. A process for preparing the poly(anthranilamide) of claim 1, comprising:
(A) providing an anthranilic ester, and
(B) converting the anthranilic ester by polycondensation with elimination of alcohol in the presence of a catalyst to give the poly(anthranilamide).

7. The process as claimed in claim 6, in which the catalyst comprises:
(1)
an alkyl compound,
an alkyl halide compound,
an acetylacetonate,
a carboxylate,
an alkoxide, and/or
a chloride
of a metal of group 1, 4, 11, 12, 13 or 14 of the Periodic Table of the Elements or
(2) a Brønsted acid.

8. The process as claimed in claim 7, in which the metal of group 1, 4, 11, 12, 13 or 14 of the Periodic Table of the Elements comprises Li, Ti, Cu, Zn, Al, Hf, Zr and/or Sn;

and/or in which the alkyl compound comprises diethylzinc and/or triethylaluminum;

and/or in which the alkyl halide compound comprises dichloro (ethyl) aluminum and/or chloro(diethyl) aluminum;

and/or in which the acetylacetonate comprises titanium (monoxide) acetylacetonate, zinc acetylacetonate and/or aluminum acetylacetonate;

and/or in which the carboxylate comprises zinc (II) acetate;

and/or in which the alkoxide comprises methoxide, ethoxide, isopropoxide, butoxide, isobutoxide and/or phenoxide;

and/or in which the alkoxide comprises aluminum triisopropoxide, titanium tetrabutoxide, titanium tetraisobutoxide and/or lithium methoxide;

and/or in which the chloride comprises zinc dichloride and/or iron trichloride;

and/or in which the Brønsted acid comprises sulfuric acid, hydrochloric acid, nitric acid and/or phosphoric acid.

9. The process as claimed in claim 6, in which the anthranilic ester comprises methyl anthranilate, ethyl anthranilate, propyl anthranilate, isopropyl anthranilate, butyl anthranilate and/or isobutyl anthranilate.

10. The process as claimed in claim 6, in which step (B) is conducted at a reaction temperature in the range from 120° C. to 300° C.;

and/or in which step (B) is conducted at a pressure in the range from 0.10 $bar_{(abs.)}$ to <1.0 $bar_{(abs.)}$.

11. The process as claimed in claim 6, in which step (B) is conducted in the absence of a solvent, wherein step (B) is followed by a process comprising:

(C) (i) dissolving the poly (anthranilamide) in a mineral acid to obtain a mineral acid solution of the poly (anthranilamide); and (D) (i) isolating the poly (anthranilamide) dissolved in the mineral acid from the mineral acid solution, comprising a step of precipitating in water.

12. The process as claimed in claim 6, in which step (B) is conducted in the presence of a solvent, wherein the solvent comprises an organic solvent which is in liquid form under the reaction conditions of step (B), an ionic liquid, or a mixture thereof, and, in step (B), the poly (anthranilamide) is obtained such that it is suspended in the solvent, wherein step (B) is followed by a process comprising:

(C) (ii) dissolving the poly (anthranilamide) suspended in the solvent in a mineral acid and separating off the solvent to obtain a mineral acid solution of the poly (anthranilamide); and (D) (ii) isolating the poly (anthranilamide) dissolved in the mineral acid from the mineral acid solution, comprising a step of precipitating in water.

13. The process as claimed in claim 6, in which step (B) is conducted in the presence of a solvent, wherein the solvent comprises an ionic liquid or a mixture of an ionic liquid and an organic solvent which is in liquid form at the reaction temperature, and, in step (B), the poly (anthranilamide) is obtained such that it is dissolved in the solvent, wherein step (B) is followed by a process comprising:

(D) (iii) isolating the poly (anthranilamide) dissolved in the solvent from the solution in the solvent, comprising a step of precipitating in water.

14. The process as claimed in claim 12, in which the organic solvent comprises diphenyl ether, N-methyl-2-pyrrolidone, 1,3-dimethyl-2-imidazolidinone, hexamethylphosphoramide, or a mixture thereof, and/or in which the ionic liquid comprises 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate, a dialkylimidazolium phosphate, or a mixture thereof.

15. The process as claimed in claim 6, in which step (A) comprises converting anthranilic acid to isatoic anhydride and reacting the isatoic anhydride with an alcohol to give the anthranilic ester;

and/or in which step (A) comprises reacting anthranilic acid with an alcohol to give the anthranilic ester.

16. The process as claimed in claim 15, in which the reaction with the alcohol in step (A) is conducted in the presence of a catalyst, wherein step (B) is conducted without prior removal of the catalyst used in step (A) and no catalyst other than the catalyst used in step (A) is added.

17. A fiber comprising the poly(anthranilamide) of claim 1.

18. A composite comprising the poly (anthranilamide) of claim 1 and another material comprising a metal, a mineral material or a polymer other than poly(anthranilamide).

19. The process as claimed in claim 13, in which the organic solvent comprises diphenyl ether, N-methyl-2-pyrrolidone, 1,3-dimethyl-2-imidazolidinone and/or hexamethylphosphoramide, and/or in which the ionic liquid comprises 1-ethyl-3-methylimidazolium acetate, 1-butyl-3-methylimidazolium acetate, 1-butyl-3-methylimidazolium butyrate, 1-butyl-3-methylimidazolium nitrate, 1-butyl-3-methylimidazolium methylsulfonate and/or a dialkylimidazolium phosphate.

* * * * *